(12) United States Patent
Nojiri

(10) Patent No.: US 8,484,753 B2
(45) Date of Patent: Jul. 9, 2013

(54) HOOKING NONEXPORTED FUNCTIONS BY THE OFFSET OF THE FUNCTION

(75) Inventor: Daisuke Nojiri, Fremont, CA (US)

(73) Assignee: McAfee, Inc., Santa Clara, CA (US)

( * ) Notice: Subject to any disclaimer, the term of this patent is extended or adjusted under 35 U.S.C. 154(b) by 464 days.

(21) Appl. No.: 12/629,330

(22) Filed: Dec. 2, 2009

(65) Prior Publication Data

US 2011/0131657 A1    Jun. 2, 2011

(51) Int. Cl.
*G06F 21/00* (2006.01)

(52) U.S. Cl.
USPC .................. 726/30; 726/26; 726/27; 726/28; 726/29; 713/187

(58) Field of Classification Search
USPC ...................................... 726/26–30; 713/187
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2005/0015760 A1* | 1/2005 | Ivanov et al. | 717/168 |
| 2005/0028002 A1 | 2/2005 | Christodorescu et al. | |
| 2005/0256960 A1 | 11/2005 | Ganesh et al. | |
| 2009/0126017 A1 | 5/2009 | Chahal | |
| 2009/0172814 A1* | 7/2009 | Khosravi et al. | 726/23 |
| 2009/0327711 A1 | 12/2009 | Goldsmid et al. | |
| 2010/0031361 A1* | 2/2010 | Shukla | 726/24 |

OTHER PUBLICATIONS

Alex Sotirov, "Hotpatching and the Rise of Third-Party Patches", BlackHat USA 2006.
eEye released a third-party patch for CVE-2006-1359 in 2006.
Ilfak Guilfanov released a third-party patch for WMF vulnerability (CVE-2005-4560) in 2005.
PCT International Search Report and the Written, PCT/US2010/058731, Jul. 13, 2011, 8 pages.
PCT International Preliminary Report on Patentability, issued Jun. 5, 2012, and Written Opinion of the International Searching Authority, mailed Jul. 13, 2011, for International Application No. PCT/US2010/058731, 5 pages.

* cited by examiner

*Primary Examiner* — Philip Chea
*Assistant Examiner* — Ghazal Shehni
(74) *Attorney, Agent, or Firm* — Patent Capital Group

(57) ABSTRACT

Methods, systems, and apparatus, including computer programs encoded on a computer storage medium, for obfuscated malware. In one aspect, a method includes accessing offset data associated with a binary executable, the offset data including an offset of a nonexported function; and modifying instructions at the offset. In another aspect, a method includes analyzing a reference generated for a binary executable, identifying a unique identifier for the binary executable, determining an offset of a nonexported function in the binary executable, and generating offset data that includes the offset and the unique identifier.

13 Claims, 5 Drawing Sheets

HOOKING NONEXPORTED FUNCTIONS BY THE OFFSET OF THE FUNCTION

BACKGROUND

This application relates to malware programs and malware protection programs.

Malware programs identify vulnerabilities in binary files, and then execute malicious code exploiting the vulnerabilities. A vulnerability targeted by malware programs, for example, is the assignment of a value to a variable without performing any bounds checking on the value. Because some programming languages (e.g., C and C++) do not perform any automatic bounds checking on variable assignments, such an assignment may cause the larger value to overflow into memory adjacent to the variable. Thus, when the value assigned to the variable is larger than the space allocated to the variable, a buffer overflow results. Malware programs can use the buffer overflow to take control of the memory adjacent to the variable, e.g., the call stack.

Another example of a vulnerability is a dangling pointer. A dangling pointer is a pointer that is created when the object of the pointer is deleted, but the value of the pointer is not changed. The pointer continues to point to a memory location that is no longer being used to store the object of the pointer. If, for example, the pointer was used to make a virtual function call, a malware program can exploit the dangling pointer to call a function at a different address. Thus, the malware program can use the dangling pointer to execute malicious code. Malware programs target other types of vulnerabilities also. Other examples of vulnerabilities that can be monitored are null pointer references, broken pointer references, integer overflows, etc. Vulnerabilities can also be exploited through scripts, such as JavaScript™. For example, malware programs typically encode malicious code in a call to the JavaScript™ "unescape" function.

These vulnerabilities can exist in different places in binary executables, including in both exported and nonexported functions. Exported functions in a binary executable are functions that are accessible by external references. For example, a DLL external to a binary executable can call an exported function within the binary executable through the external reference of the exported function. In another example, an exported function in a library can be called from a binary executable that is external to the library.

If there is a vulnerability in an exported function, a malware protection program can monitor any usage of the exported function by hooking function calls to the exported function. A malware protection program can hook function calls to the exported function by intercepting the function calls and monitoring the properties of the function calls to ensure that the function calls are not used to exploit a vulnerability. For example, if the malware protection program intercepts function calls to an exported function, it can monitor the values that are passed into the exported function and ensure that none of the values cause a buffer overflow in the exported function. Additionally, it can ensure that none of the values attempt to exploit a dangling pointer.

In contrast, nonexported functions are functions that are not designed to be called from external references. Thus, an external binary DLL cannot call a nonexported function in a binary executable because the binary executable does not maintain the location of nonexported functions within the binary executable. Nonexported functions are sometimes referred to as local functions, because they are only accessible from the binary executable in which the nonexported function resides. Vulnerabilities also exist in nonexported functions. If the vulnerability exists in a nonexported function, the malware protection program cannot hook the calls to the nonexported function by intercepting external function calls because there are no external references to a nonexported function. The only references to the nonexported function are internal to the binary file. The malware protection program can hook calls to exported functions that call the nonexported function with the vulnerability, but this is not an effective method of monitoring vulnerabilities in the nonexported function and it often results in false positives. This is because a malware protection program uses a hook to examine arguments that are passed into a function. If the vulnerability does not exist within the function that is hooked (i.e., the exported function), but rather, exists in a function that is referenced by the hooked function (i.e., the nonexported function), the malware protection program can only attempt to predict what arguments are used to exploit a vulnerability.

SUMMARY

In general, one innovative aspect of the subject matter described in this specification can be embodied in methods that include the actions of identifying a binary executable in a host computer memory, the binary executable being allocated memory space in the host computer memory, the memory space addressed at a first memory location; accessing offset data associated with the binary executable, the offset data identifying an offset that defines a second memory location relative to the first memory location, the second memory location different from the first memory location, the second memory location storing a nonexported function within the binary executable; and modifying instructions at the second memory location to route a code path to a host protection processor. Other embodiments of this aspect include corresponding systems, apparatus, and computer programs, configured to perform the actions of the methods, encoded on computer storage devices.

Another innovative aspect of the subject matter described in this specification can be embodied in methods that include the actions of analyzing a reference file generated for a binary executable, the reference file containing a representation of instructions that are in the binary executable; identifying a unique identifier for the binary executable; locating a nonexported function in the binary executable from the analysis of the reference file; determining an offset for the nonexported function, the offset being the number of bytes between the nonexported function and the beginning of the binary executable; and generating offset data that includes the offset and the unique identifier. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

§1.0 Overview

Figure 1:
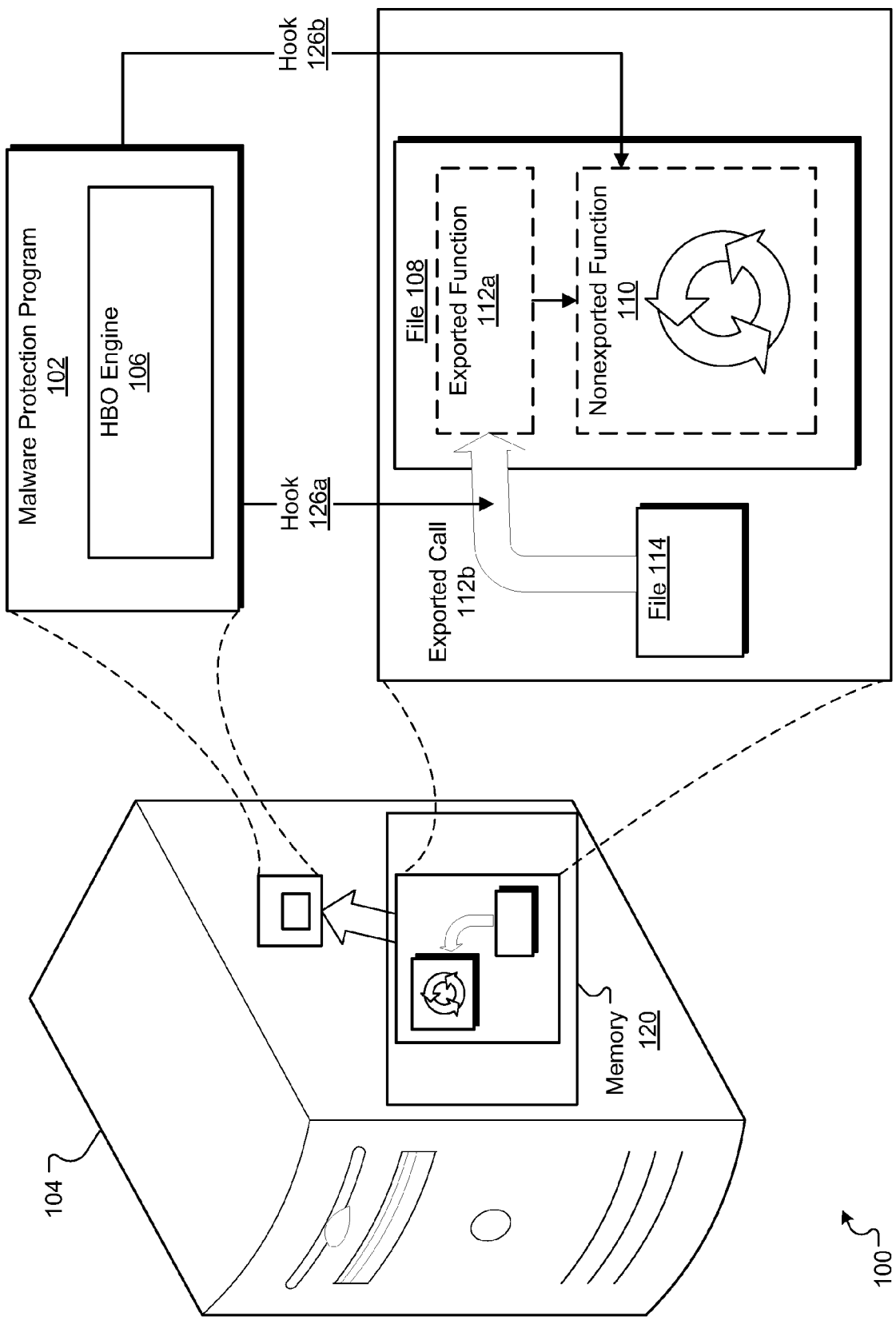
FIG. 1 is a diagram of an example malware protection program.

FIG. 1 is a diagram 100 of an example malware protection program 102. A computer 104 uses the malware protection program 102 to monitor exported and nonexported functions in binary files. The malware protection program 102 monitors files that are loaded in computer memory 120, e.g., file 108 and file 114.

In some implementations, the malware protection program 102 protects a computer 104 by identifying malware programs in the computer memory 120 and monitoring the files in the computer memory 120 for malicious activity.

In some implementations, the malware protection program 102 can monitor exported functions with vulnerabilities by hooking a function call to the exported function. For example, the malware protection program 102 can use a wrapper library to intercept the exported function call (e.g., exported call 112b) to the exported function (e.g., exported function 112a) from an external file (e.g., file 114). In other implementations, the malware protection program 102 can modify the import table of a binary file to intercept function calls to exported functions in the binary file (e.g., exported call 112b). Other methods can also be used to hook exported functions.

After the malware protection program 102 has hooked the exported function call, the malware protection program 102 can monitor all function calls to the exported function (e.g., exported call 112b) through the hook 126 to ensure that the call is not attempting to execute malicious code on vulnerabilities in the memory image of file 108. If the function call attempts to exploit a vulnerability in the exported function, the malware protection program 102 can prevent execution of the exported function. Alternatively, the malware program 102 can allow the exported function to execute but provide the user with notice that the exported function contains a vulnerability that is being exploited.

In some implementations, a vulnerability can exist in a binary executable that is accessed by a noncompiled file, such as a script file. Malware program can execute calls to the binary executable using the script to exploit vulnerabilities in the binary executable. For example, there may be a vulnerability in the "jscript.dll" JavaScript™ library. The malware program can execute JavaScript™ calls to the "jscript.dll" that exploit the vulnerability.

In some implementations, the malware protection program 102 uses a hook by offset ("HBO") engine 106 to hook into function calls to the nonexported function 110. The malware protection program 102 monitors execution of the nonexported function 110 through the hook. However, the malware protection program 102 does not hook the nonexported function 110 as it does the exported function 112a (e.g., through a wrapper library or a modified import table) because nonexported functions are not accessible by external references outside the file 108, such as through wrapper libraries or external code modules.

In some implementations, the HBO engine 106 receives the location of the nonexported function 110 in the binary file in the form of HBO data. The HBO engine 106 then inserts a hook 126b at the location of the nonexported function 110 in the binary file. In some implementations, the hook 126b can be a snippet of code that redirects the code path of the nonexported function 110. Thus, a subsequent execution of the instructions at the vulnerability will require execution of the hook 126b, which can redirect the code execution to the malware protection program 102. The malware protection program 102 can determine whether execution of the nonexported function 110 will exploit a vulnerability in the nonexported function 110. Thus, the nonexported function 110 can be monitored in a similar manner that the malware protection program 102 monitors exported functions (e.g., exported function 112a) to determine whether execution of the nonexported function 110 will exploit a vulnerability in the nonexported function 110.

§2.0 Hook by Offset

Figure 2:
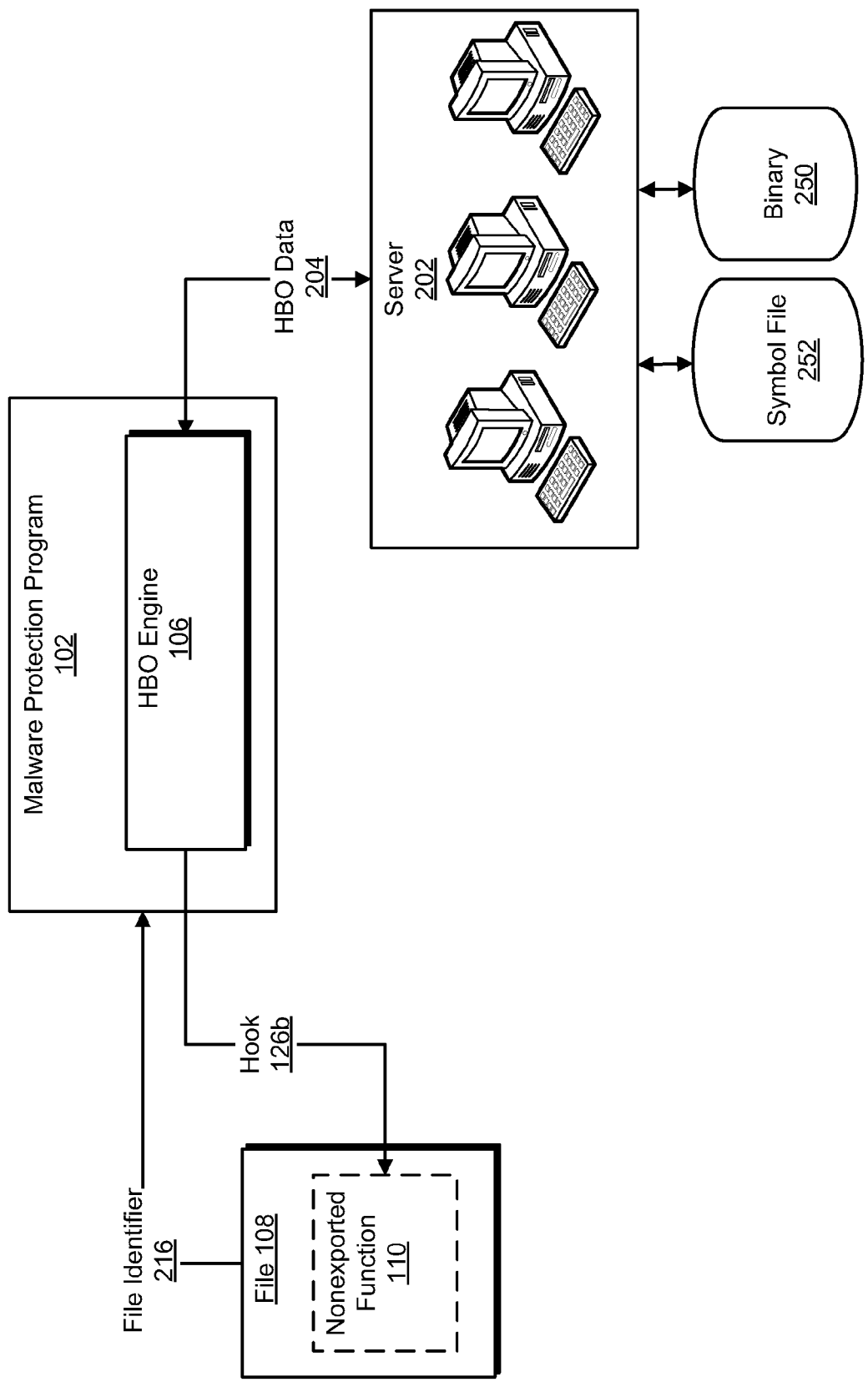
FIG. 2 is a diagram of an example hook by offset engine.

FIG. 2 is a diagram 200 of an example hook by offset ("HBO") engine 106. The HBO engine 106 can receive HBO data 204 from a server 202. Based on the HBO data 204, the HBO engine 106 can insert the hook 126b at the location of the nonexported function containing the vulnerability. The malware protection program 102 can monitor the memory image of file 108 through the hook 126b, and prevent any malicious behavior.

§2.1 Generation of HBO Data by the Server

In some implementations, the server 202 provides the HBO engine 106 with a location to hook (i.e., the location of the nonexported function with a vulnerability) through the HBO data 204. The HBO data 204 includes a unique identifier for a file, e.g., a hash, and the location of nonexported functions in the file with vulnerabilities. In some implementations, the unique identifier can be used to distinguish between different versions of the same file name. In some implementations, the location is the offset of the nonexported function with the vulnerability, where the offset is the distance in bytes of the nonexported function from the beginning of the binary file. The HBO engine 106 measures the offset when the file is loaded in memory.

For example, the server 202 provides HBO data 204 for the file "browser.dll," which is a binary file that is used in Internet browsing software, and known to be exploited by malware. The HBO data 204 for "browser.dll" can include a hash code for a particular version of the file "browser.dll," and the offset for the nonexported function 110, because the nonexported function 110 includes a vulnerability that can be exploited by malicious code (e.g., a possible buffer overflow, a dangling pointer).

Various known methods exist for identifying such vulnerabilities in a file. In some implementations, a user can manually debug a binary 250, or run automated scripts to debug the binary 250. In some implementations, a user can use a reference file (e.g., a symbol file) to debug the binary 250. The reference file can be a symbol file that is used to debug a binary executable. For example, manual debugging or automated testing can be used to identify a possible buffer overflow in a nonexported function in the binary 250.

Once a vulnerability is located in a nonexported function in the binary 250, the same nonexported functions can be found in other versions of the binary file through analysis of the reference file (e.g., symbol file 252) associated with the other versions of the binary file, e.g., file 108. The server 202 can include one or more components (e.g., a file analyzer) that generate the HBO data 204 based on the analysis of the file 108 and the reference file (e.g., symbol file 252) associated with the file 108.

For example, once it has been determined that the nonexported function 110 from the file "browser.dll" contains a vulnerability, the symbol file 252 can be used to determine the offset of the nonexported function 110 in other versions of the binary "browser.dll." In some implementations, the server 202 utilizes the "lookup" function to find the offset of the nonexported function 110 in those versions of "browser.dll."

The offset of the nonexported function 110 is transmitted in the HBO data 204 to the HBO engine 106, along with a unique identifier for a particular version of the file, e.g., a hash. For example, if the nonexported function containing a possible buffer overflow in a particular version of the binary "browser.dll" (e.g., the nonexported function 110) is 20 bytes from the beginning of the file when the file 108 is loaded into memory, the offset in the HBO data 204 is set to 20 bytes. If there is another vulnerability in the form of a dangling pointer that is 40 bytes from the beginning of the file when the file 108 is loaded into memory, the HBO data 204 will also include the offset of 40 bytes. Thus, HBO data 204 includes offsets of the vulnerabilities (i.e., 20 bytes and 40 bytes) and a unique hash code identifying the file 108 as a particular version of the file "browser.dll." The server 202 can send this HBO data 204 to the HBO engine 106.

In some implementations, the server 202 can include in the HBO data 204 additional data to corroborate the offset data provided in the HBO data 204. For example, the HBO data 204 can include a version string, or byte patterns around the offset of the nonexported function, that the HBO engine 106 can use to verify that it has the correct offset and avoid placing the hook 126b at the wrong location.

§2.2 Use of the HBO Data by the Malware Protection Program

In some implementations, the HBO engine 106 can use the HBO data 204 to identify files that have vulnerabilities in nonexported functions. Based on the HBO data 204, the HBO engine 106 can insert hooks at the location provided by the HBO data 204 in the file identified by the HBO data 204. For example, the HBO engine 106 can receive the HBO data 204 that includes a file hash value of H, and an offset of 20 bytes. Thus, the HBO engine 106 can determine to insert a hook at 20 bytes from the beginning of the file that matches the hash value of H (e.g., "browser.dll"). Because there is also a second offset in the HBO data 204, the HBO engine 106 can determine to insert a hook at 40 bytes from the beginning of the file that matches the hash value of H.

Figure 3:
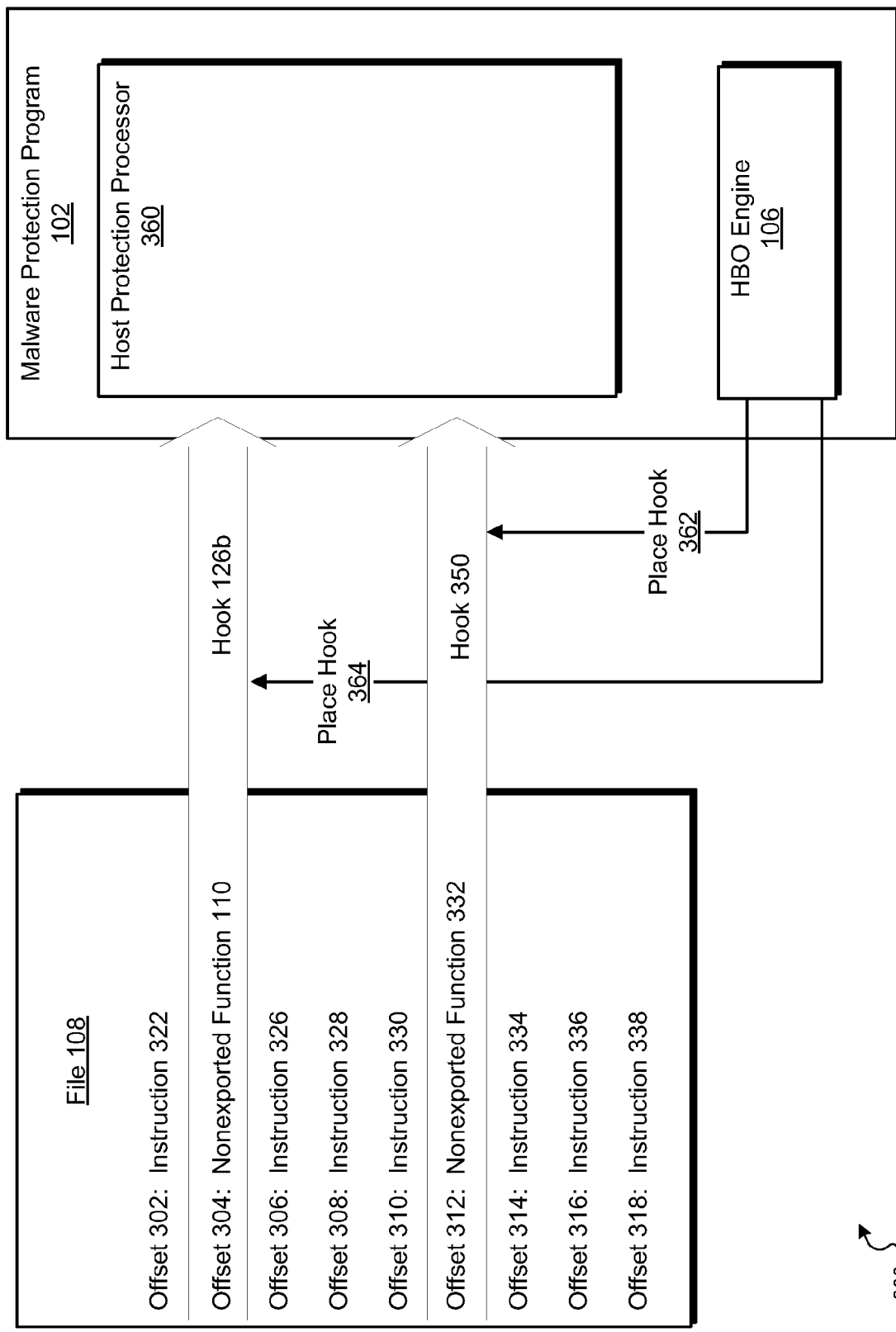
FIG. 3 is a diagram of the malware protection program utilizing hooks in a host protection processor.

FIG. 3 is a diagram 300 of the malware protection program 102 utilizing hooks in a host protection processor 360. In some implementations, the HBO engine 106 identifies the file matching the file identifier from the HBO data 204, and inserts the hook 126b at the location from the HBO data 204. The hook 126b can be a code snippet that redirects the code path to host protection processor 360, to ensure that the non-exported function 110 is not exploited by malware.

For example, the HBO engine 106 can determine that a particular version of the file "browser.dll" matches the hash value of H, and thus, the HBO engine 106 can insert the hook 126b into "browser.dll" at the 20 byte offset (e.g., offset 304). The HBO engine 106 can also determine that the particular version of the file "browser.dll" requires a hook at a second offset (e.g., offset 312), and the HBO engine 106 can insert a hook 350 at the second offset. The hooks 126b and 350 can be a snippet of code that transfers code execution of the nonexported functions 110 and 332 to the host protection processor 360.

In some implementations, the HBO engine 106 can also compare the version string and byte patterns from the HBO data 204, to the version strings from the file 108 and the byte patterns near the offset 304 and 312. The version strings can be used to verify a particular version of a file, and the byte patters can be used to verify that the offset provided by the HBO data 204 is accurate. For example, the server 202 can provide in the HBO data 204 that the offset is 20 bytes and the byte pattern for the nineteenth byte is "8b ff 55 8b ec 56 8b 75 08 83 7e 48 00 57 bf 7e." The HBO engine 106 can determine if the byte pattern at the 20 byte offset in the file 108 is actually "8b ff 55 8b ec 56 8b 75 08 83 7e 48 00 57 bf 7e," and if so, it can insert the hook 126b at the 20 byte offset.

In some implementations, the host protection processor 360 monitors execution of the nonexported function 110 through the hook 126b placed by the HBO engine 106. If execution of the nonexported function 110 would result in an exploitation of a vulnerability in the nonexported function 110, the host protection processor 360 prevents execution of the nonexported function 110. If execution of the nonexported function 110 does not result in an exploitation of the vulnerability, the host protection processor 360 permits execution of the nonexported function 110.

For example, the hook 126b can route the code path of the nonexported function 110 to the host protection processor 360. The host protection processor 360 can perform bounds checking on the values provided to the nonexported function to ensure that they do not exceed the bounds of the variables in the nonexported function that will receive the values. Thus, the host protection processor 360 can determine if a buffer overflow will occur, based on the value that is being assigned to the variable. If the host protection processor 360 determines that a buffer overflow will occur, the host protection processor 360 terminates code execution and returns control back to the original call. The host protection process 360 also reports the failed call and malicious code to the user.

In some implementations, the host protection processor 360 kills the active process executing "browser.dll." In some implementations, the host protection processor 360 can permit execution of malicious code that will result in the exploitation of a vulnerability. Rather than kill the process, the host protection processor 360 can notify the user of the computer 104 that a malicious program is running.

Figure 4:
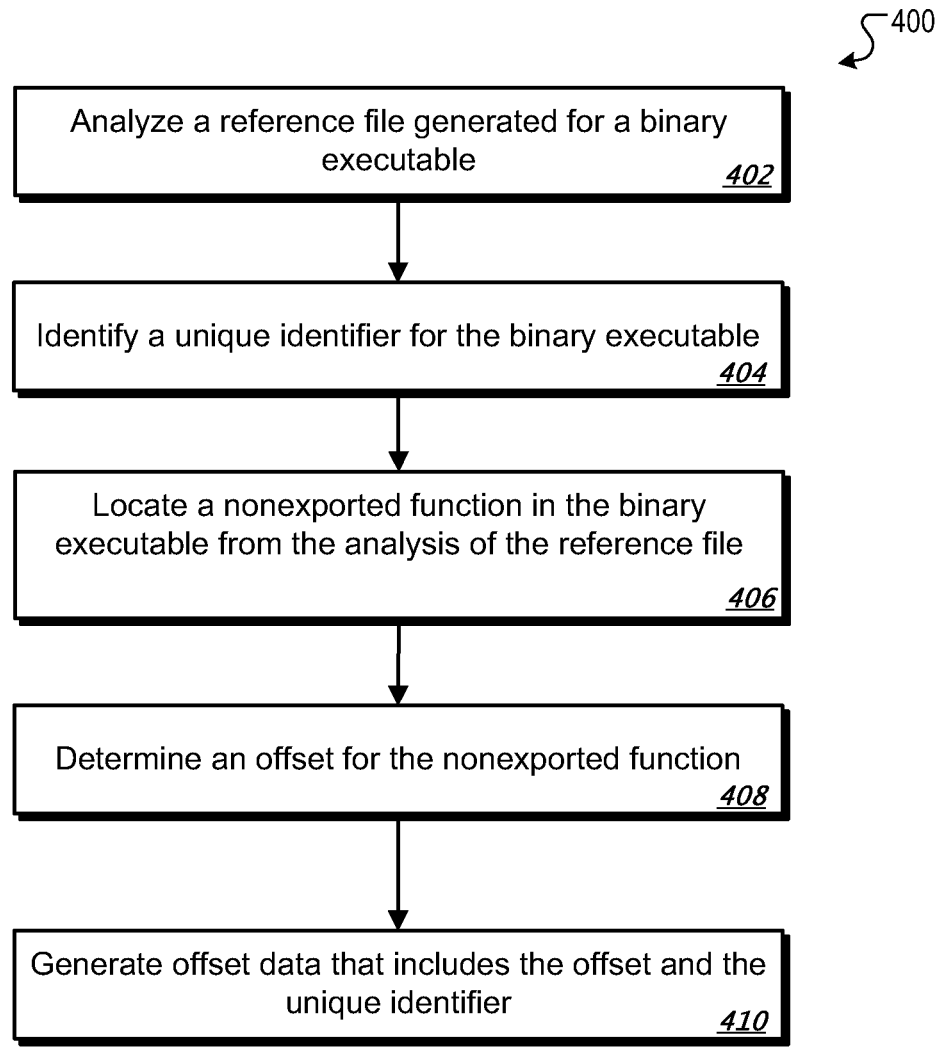
FIG. 4 is a flow diagram of an example hook by offset identification process.

FIG. 4 is a flow diagram of an example hook by offset identification process 400. The process 400 can, for example, be implemented by the server 202 of FIG. 2, and as described in FIG. 3.

Stage 402 analyzes a reference file generated for a binary executable. For example, the server 202 can analyze the symbol file generated for a particular version of the binary file "browser.dll."

Stage 404 identifies a unique identifier for the binary executable. For example, the server 202 can identify the hash code H for the file "browser.dll" as the unique identifier of the particular version of the file.

Stage 406 locates a nonexported function in the binary executable from the analysis of the reference file. For example, it may be determined that there is a possible buffer overflow in the nonexported function "NE" in the file "browser.dll." Using the symbol file 252, the server 202 can identify the location of the nonexported function "NE" in a particular version of the file "browser.dll."

Stage 408 determines an offset for the nonexported function. For example, the server 202 can determine that the file "browser.dll" includes the nonexported function NE. The server 202 can use the symbol file 252 to determine that the nonexported function NE is 20 bytes from the beginning of the binary file "browser.dll" when the file is loaded in memory.

Stage 410 generates offset data that includes the offset and the unique identifier. For example, the server 202 can generate the HBO data 204 that includes the hash code H, and the offset "20 bytes."

Figure 5:
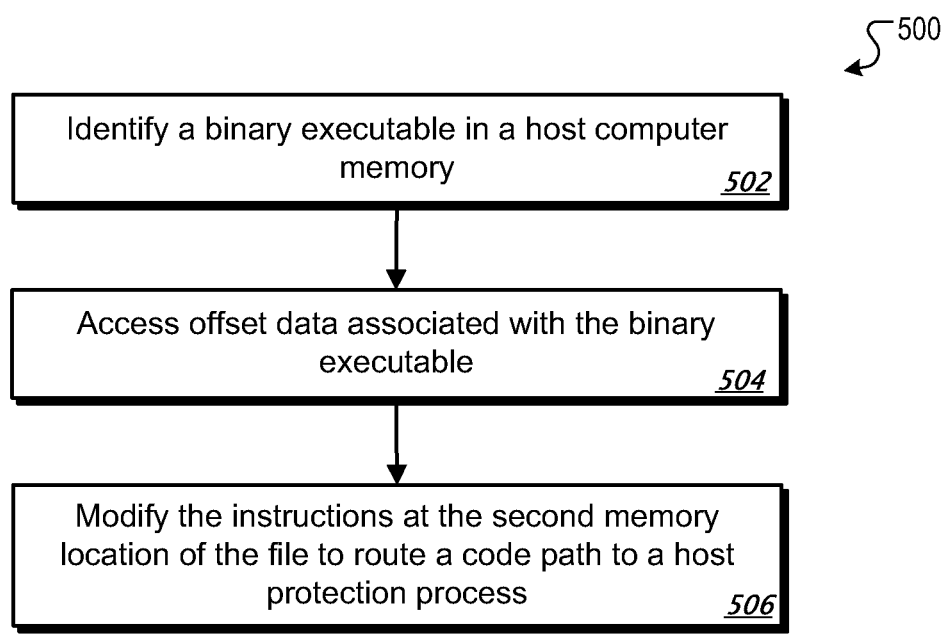
FIG. 5 is a flow diagram of an example hook by offset process.

FIG. 5 is a flow diagram of an example hook by offset process 500. The process 500 can, for example, be implemented by the HBO engine 106 of FIG. 1, and as described in FIGS. 2 and 3.

Stage 502 identifies a binary executable in a host computer memory. For example, the HBO engine 106 can receive the HBO data 204 that includes a hash of H. The HBO engine 106 can identify a particular version of the binary file "browser.dll" as the binary file that is identified by the hash code of H.

Stage 504 accesses offset data associated with the binary executable. For example, the HBO engine 106 can access the offsets that are identified in the HBO data 204 that is associated with the "browser.dll." The HBO engine 106 can access the offset of 20 bytes as an offset associated with a particular version of "browser.dll."

Stage 506 modifies the instructions at the second memory location of the binary executable to route a code path to a host protection processor. For example, the HBO engine 106 can modify the code at the offset (e.g., 20 bytes) to route the code path to the host protection processor 360. Any subsequent execution of the code first calls the host protection processor 360 before the code is executed. Thus, the host protection processor 360 can determine whether subsequent executions of code are attempts to exploit vulnerabilities in the particular version of "browser.dll."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    identifying that a binary executable in a host computer memory includes a nonexported function with a particular vulnerability, the binary executable being allocated memory space in the host computer memory, the memory space addressed at a first memory location;
    accessing offset data associated with the binary executable, the offset data identifying an offset that defines a second memory location relative to the first memory location, the second memory location different from the first memory location, the second memory location storing the nonexported function within the binary executable; and
    modifying instructions at the second memory location to route a code path to a host protection processor.

2. The method of claim 1, wherein the nonexported function is called by an exported function.

3. The method of claim 1, wherein accessing offset data comprises:
    identifying a hash ID that uniquely identifies the binary executable; and
    identifying an offset associated with the binary executable based on the hash ID.

4. The method of claim 1, wherein the offset data further comprises a version string for the binary executable.

5. The method of claim 1, wherein the offset data further comprises a byte pattern adjacent to the offset.

6. A computer-implemented method, comprising:
    analyzing, using at least one processor device, a reference file generated for a binary executable determined to have a particular vulnerability, the reference file containing a representation of instructions that are in the binary executable;
    identifying a unique identifier for the binary executable;
    locating a nonexported function corresponding to the particular vulnerability in the binary executable from the analysis of the reference file;
    determining an offset for the nonexported function, the offset being the number of bytes between the nonexported function and the beginning of the binary executable; and
    generating offset data that includes the offset and the unique identifier.

7. The method of claim 6, wherein the reference file is a symbol file.

8. The method of claim 6, wherein the offset data further comprises a version string for the binary executable.

9. The method of claim 6, wherein the offset data further comprises a byte pattern adjacent to the offset.

10. A system, comprising:
    a processor device;
    a memory element; and
    a file analyzer configured, when executed by the processor device, to analyze a reference file generated for a binary executable determined to have a particular vulnerability, the reference file comprising a representation of instructions that are in the binary executable; locate a nonexported function corresponding to the particular vulnerability in the reference file; and determine an offset for the nonexported function, the offset being the number of bytes between the nonexported function and the beginning of the binary executable.

11. A system, comprising:
    a host computer memory configured to store data for a computer;
    a hook by offset engine that performs operations comprising:
        identifying that a binary executable in a host computer memory includes a nonexported function with a particular vulnerability, the binary executable being allocated memory space in the host computer memory, the memory space addressed at a first memory location;
        accesses offset data associated with the binary executable, the offset data identifying an offset that defines a second memory location relative to the first memory location, the second memory location storing the nonexported function within the binary executable; and
        modifies instructions at the second memory location to route a code path to a host protection processor.
    a host protection processor that performs operations comprising:
        determining whether execution of the nonexported function would result in exploitation of the particular vulnerability; and
        determining whether to allow execution of the nonexported function 12. The system of claim 11, wherein determining whether execution of the nonexported function would result in exploitation of the particular vulnerability includes monitoring for attempts to exploit the particular vulnerability.

13. The system of claim 11, wherein the host protection process is adapted to prevent the execution of the nonexported function.

\* \* \* \* \*